US012662754B2

(12) United States Patent
Sick et al.

(10) Patent No.: US 12,662,754 B2
(45) Date of Patent: Jun. 23, 2026

(54) EXTRUSION APPARATUS FOR TURF FIBER MONOFILAMENT

(71) Applicant: Polytex Sportbelage Produktions-GmbH, Grefrath (DE)

(72) Inventors: Stephan Sick, Baden-Baden (DE); Sven Hamann, Muehlheim (DE); Dario Grochla, Bochum (DE); Dirk Sander, Kerken (DE)

(73) Assignee: Polytex Sportbelage Produktions-GmbH, Grefrath (DE)

( * ) Notice: Subject to any disclaimer, the term of this patent is extended or adjusted under 35 U.S.C. 154(b) by 163 days.

(21) Appl. No.: 18/480,189

(22) Filed: Oct. 3, 2023

(65) Prior Publication Data

US 2025/0101633 A1     Mar. 27, 2025

(30) Foreign Application Priority Data

Sep. 21, 2023     (EP) ..................................... 23198684

(51) Int. Cl.
| | |
|---|---|
| B29C 48/03 | (2019.01) |
| B29C 48/05 | (2019.01) |
| B29C 48/345 | (2019.01) |
| D01D 4/02 | (2006.01) |
| D01D 5/08 | (2006.01) |
| D01D 5/088 | (2006.01) |
| D01D 5/253 | (2006.01) |
| D01D 5/34 | (2006.01) |
| D01F 6/04 | (2006.01) |
| D01F 8/06 | (2006.01) |
| B29K 23/00 | (2006.01) |

(52) U.S. Cl.
CPC ............. *D01D 4/02* (2013.01); *D01D 5/0885* (2013.01); *D01D 5/253* (2013.01); *D01D 5/34* (2013.01); *D01F 6/04* (2013.01); *D01F 8/06* (2013.01); *B29K 2023/0625* (2013.01); *D10B 2321/021* (2013.01); *D10B 2505/202* (2013.01)

(58) Field of Classification Search
CPC ....... B29C 48/03; B29C 48/05; B29C 48/345; B29K 2023/0625; D01D 4/02; D01D 5/08; D01D 5/253; D10B 2321/021
USPC ......... 264/176.1, 177.13, 331.17; 425/382.2, 425/461, 462, 463, 464
See application file for complete search history.

(56) References Cited

U.S. PATENT DOCUMENTS

| | | | |
|---|---|---|---|
| 3,707,593 | A | 12/1972 | Fukada et al. |
| 9,469,921 | B2 | 10/2016 | Olde Weghuis et al. |
| 2020/0308777 | A1 | 10/2020 | Sick et al. |
| 2021/0238771 | A1 | 8/2021 | Sick et al. |
| 2022/0341091 | A1 | 10/2022 | Decorte et al. |

FOREIGN PATENT DOCUMENTS

| | | |
|---|---|---|
| WO | 2019/086632 A1 | 5/2019 |

OTHER PUBLICATIONS

Search Report for European Application No. 23198684.5 dated May 16, 2024.

*Primary Examiner* — Leo B Tentoni
(74) *Attorney, Agent, or Firm* — Harness, Dickey & Pierce, P.L.C.

(57) ABSTRACT

An extrusion apparatus suitable for manufacturing artificial turf polymer fiber, in particular from LLDPE that is free of fiber splitting, wherein the extrusion apparatus is characterized in that a ratio of an equivalent diameter of the nozzle outlet over an axial length of the inner channel of the nozzle is from 0.90 to 1.10, or from 0.95 to 1.05.

15 Claims, 8 Drawing Sheets

302          304          306

308

310 crystalline amorphous

EXTRUSION

3

W          30

10          D d

Tc
Rc 20          138°          1

Prior Art

EXTRUSION APPARATUS FOR TURF FIBER MONOFILAMENT

CROSS-REFERENCE TO RELATED APPLICATIONS

This application claims priority to and the benefit of European Patent Application No. 23198684.5 filed on Sep. 21, 2023, the entire contents of each of which are incorporated herein by reference.

FIELD OF THE INVENTION

The invention relates to an extrusion device, and more specifically, an extrusion device for making artificial turf fiber, a method of using the extrusion device for making the artificial turf fiber, and the artificial turf fiber obtained by the method of using the extrusion device.

BACKGROUND AND RELATED ART

Extrusion is a widespread method for manufacturing polymer fibers. In the simplest case, fluid polymer melt is pressed through a microscopic circle-shape opening to form a circle-shape-cylindrical fiber. However, applications exist where polymer fibers with a non-circle-shape cross section are preferable. By changing the shape and size of the opening of the extrusion device the shape and size of the formed fiber can also be changed. The shape and size of the extrusion opening is a factor which influences the laminarity of the polymer flow. For example, if the shape has a large gradient in thickness, i.e., a transition between a thick and a thin region on a short distance, turbulent instability may form in the polymer flow and result in discontinuities and/or defects of the product. Also, the shape and size of the extrusion opening in single extrusion or coextrusion determines the shear forces exerted on the processed polymer molecules and may often result in early fraying or unraveling of the formed fibers due to splitting or dividing of the fibers along their longitudinal axis.

Currently, artificial turf fiber may be made using LLDPE (Linear Low Density Polyethylene) polymer available as LLDPE-C8 (C8 is 1-Octene comonomer), or LLDPE-C6 (C6 is 1-Hexene comonomer). LLDPE-C4 is relatively inexpensive compared to LLDPE-C8 and LLDPE-C6, however, it can only accommodate relatively small shear forces in the transverse direction without weakening the fiber and making it prone to early fraying due to fiber splitting. The fiber splitting problem is particularly pronounced with fiber designs that require extrusion nozzle outlet designs that exert large transversal shear forces to the polymer molecules as they exit through the outlet of the extrusion nozzle apparatus. The magnitude and direction of these forces may depend on several factors and may be generally more pronounced with smaller diameter nozzle outlets or non-cylindrical nozzle outlets for forming turf fiber shapes having relatively large width to thickness ratio (WTR). Currently, because of the fiber splitting problem, turf fiber is made preferably from the more expensive LLDPE-C6 or LLDPE-C8 that can generally withstand larger transversal shear forces than the LLDPE-C4 polymer and exhibit less fiber splitting.

Patent documents U.S. Pat. No. 3,707,593A, US2021238771A1 and US2022341091A1 describe manufacturing artificial turf fiber by extrusion processes. However, none of these references address the fiber splitting problem let alone disclose any solution to this problem.

Therefore, it is desirable to develop a solution for reducing LLDPE fiber fraying or unravelling due to fiber splitting and allowing the use of less expensive LLDPE materials such as LLDPE-C4 for making artificial turf fiber without the fiber splitting problem for both cylindrical and non cylindrical shape turf fiber.

SUMMARY OF THE INVENTION

The present invention provides an improved extrusion apparatus and method capable of producing turf fiber, that is more resistant to fiber fraying due to fiber splitting or, preferably, effectively free of fiber fraying due to fiber splitting. The present invention is further directed to the turf fiber obtained by the inventive apparatus and method. The turf fiber obtained by the method using the inventive extrusion apparatus exhibits substantially improved resistance to fraying or unravelling due to splitting and is substantially free of fiber splitting. The present invention is particularly suitable for making turf fiber from LLDPE polymer material, including LLDPE-C8, LLDPE-C6 or LLDPE-C4 polymer material.

Fiber splitting as this term is used here means that at least a part of a fiber dividing along a generally longitudinal direction of the fiber in two or more finer parts.

The artificial turf fiber may have any suitable shape. The artificial turf fiber may have any suitable cross-sectional shape. For example, the turf fiber may have a cylindrical shape with a circle-shape or oval-shape cross-section. In some embodiments the turf fiber may have a cross-sectional shape that is V-shape, W-shape, C-shape, $\Omega$-shape and the like which are referred to hereinafter also as large width to thickness ratio ("WTR") shapes. In some embodiments, the turf fiber has a C-shape (also referred to as a curved shape) with elevated side edges referred to hereinafter also as ridges.

The extrusion apparatus is particularly suitable of producing turf fiber having a large WTR shape from LLDPE including LLDPE-C8, LLDPE-C6 and/or LLDPE-C4 polymer material with significantly improved fiber splitting resistance, and preferably essentially free of fiber splitting.

Preferably, a large WTR nozzle outlet may have a cross-sectional shape with a WTR of from 2 to 30, or from 4 to 25, or from 8 to 20. Nozzle outlets with large WTRs exert large shear forces in the transverse direction to the polymer material as it goes through the nozzle outlet which may lead to increased fiber splitting especially when the LLDPE-C4 polymer is used. The nozzle outlet may be the outlet opening of a single extrusion apparatus or a dual extrusion apparatus.

In some embodiments, the nozzle outlet may include a central opening with uniform thickness and side edge regions with different thickness compared to the central opening. The side edge regions may be arranged symmetrically with respect to a longitudinal axis of symmetry of the capillary channel of the nozzle outlet and may be opposite to each other in the transverse direction. For example, the side edge regions may have a larger thickness than the central opening. This shape results in turf fiber with better resistance to flattening due to foot traffic, however, it subjects the polymer molecules to large transversal forces as they go through the nozzle outlet which when the extrusion head uses a conventional nozzle design causes some of the turf fiber from the less expensive polymers of LLDPE-C4 and LLDPE-C6 to split.

The extrusion apparatus may be a single or a dual extrusion apparatus. For dual extrusion apparatuses, the present invention may strengthen the bonding between the two polymer materials that are coextruded to form the bicomponent fiber, and thus may reduce or prevent delamination between the two polymer materials. The cross-sectional shape of the bicomponent turf fiber may be of any suitable shape. In some embodiments, the cross-sectional shape of the bicomponent turf fiber may be a circle or an oval. In some embodiments the nozzle outlet may have a large WTR cross-sectional shape.

The present invention extrusion apparatus solves the fiber splitting problem by decreasing the length of the capillary channel of the nozzle. Specifically, it has been found, rather surprisingly, that decreasing the length of the capillary channel of the nozzle of the extrusion apparatus reduces fiber splitting and below a certain threshold value for any given nozzle outlet design the splitting may be eliminated altogether. It should be understood that a threshold length of the capillary channel of the nozzle below which the splitting problem is eliminated may differ depending on the type of the polymer and the shape and the dimensions of the nozzle outlet.

Although the inventors do not wish to be bound by theory, it is postulated that an entanglement effect of the LLDPE polymer molecules may be improved by decreasing the length of the capillary channel of the nozzle. This improvement is particularly pronounced with LLDPE-C4 polymer molecules. More specifically, it is believed that the decreased nozzle length results in an orientation of the molecules of the fibers, as they exit the extrusion nozzle, pointing away from a direction that is parallel to the longitudinal axis of the channel of the nozzle. This provides an artificial turf fiber capable of withstanding stronger shear forces, especially in the transverse direction and with better protection against splitting. It has been rather unexpectedly discovered that decreasing the length of the capillary channel of the nozzle of the extrusion apparatus enables the production of high-quality turf fiber from LLDPE, even when using the relatively inexpensive LLDPE-C4 instead of the more expensive LLDPE-C8 or LLDPE-C6 without the fiber splitting problem and even for turf fiber shapes requiring nozzle outlet designs of high WTR of at least 4.0.

More specifically, the present invention provides an extruder apparatus with an improved nozzle capable for producing turf fiber, preferably from LLDPE including LLDPE-C8, LLDPE-C6 and/or LLDPE-C4 without the splitting problem, a method using the extruder apparatus for making the turf fiber, and the turf fiber obtained by the method, as defined in the independent claims. Various embodiments of the present invention are given in the dependent claims. Embodiments of the present invention can be freely combined with each other if they are not mutually exclusive.

According to an aspect of the present invention, an extrusion apparatus is provided that is suitable for manufacturing artificial turf polymer fiber free of fiber splitting, the extrusion apparatus comprising an extrusion head comprising an inlet for receiving a polymer material, a nozzle, and a nozzle outlet, wherein the nozzle is in hydraulic connection with the inlet and the nozzle outlet. The extrusion apparatus is characterized in that a ratio of an equivalent diameter of the nozzle outlet over an axial length of the inner channel of the nozzle is from 0.90 to 1.10, or from 0.95 to 1.05.

The equivalent diameter as this term is used here is the diameter of a circle-shape cross-section nozzle outlet which has the same area as the area of the actual cross-section of the nozzle outlet. Hence, for a circle-shape cross section the equivalent diameter is the same as the actual diameter. For a non circular cross section having an area of A mm$^2$ the equivalent diameter is calculated by the square root of the $(4 \times A/\pi)$ where $\pi$ is approximately 3.14. Hence, as an example a nozzle outlet for making a turf fiber having a "W" shape having a cross-sectional area of 10 mm$^2$ the equivalent diameter will be the square root of $(4 \times 10/3.14)$ or 3.57 mm. Then, based on the 3.57 mm equivalent diameter the axial length of the nozzle can be 3.24 mm to 3.97 mm.

The nozzle outlet may have a circle-shape cross-section, an oval-shape cross-section, a rectangular shape cross-section, a V-shape cross-section, a W-shape cross-section, a C-shape cross-section, an $2-shape cross-section, or any combination thereof.

In some embodiments, the equivalent diameter of the nozzle outlet may be from 0.25 mm to 5 mm, or from 0.5 mm to 4 mm, or from 1.0 to 2.5 mm.

The extrusion apparatus is particularly suitable for polymer fiber made of LLDPE including LLDPE-C8, LLDPE-C6, and LLDPE-C4, or preferably LLDPE-C6, and LLDPE-C4, or more preferably LLDPE-C4.

In some embodiments, the axial length of the inner channel of the nozzle is from 0.5 mm to 5.0 mm, or from 0.50 mm to 3.5 mm, or from 0.50 mm to 3.0 mm, or from 0.5 mm to 2.0 mm. More generally, for any given equivalent diameter of the nozzle outlet, which is determined from the desirable equivalent diameter of the turf fiber, the axial length of the inner channel of the nozzle should be selected to ensure the ratio of the equivalent diameter of the nozzle outlet over the axial length of the inner channel of the nozzle is from 0.90 to 1.10, or from 0.95 to 1.05.

In some embodiments, the nozzle outlet comprises a rectangular-shape cross-section having a width to thickness ratio (WTR) from 2 to 30, or from 4 to 25, or from 8 to 20.

In some embodiments, the nozzle outlet comprises a circle-shape cross section, an oval-shape cross section or a rectangular-shape cross section, or any combination thereof.

In some embodiments, the nozzle outlet has a central opening having a concave-shape, rectangular-shape, or circle-shape cross section and first and second edge openings having a circle-shape, oval-shape, or rectangular shape cross section arranged symmetrically with respect to a longitudinal axis of symmetry of the capillary channel of the nozzle. The central opening of the nozzle outlet may have a constant thickness along its entire width. In some embodiments, the first and second edge openings of the nozzle outlet may each have a circle-shape cross section.

In some embodiments, the central opening may have a radius curvature of 1.2 mm to 2.0 mm or 1.4 mm to 1.7 mm, a width of 2.5 mm to 6.0 mm or 3.5 mm to 4.5 mm and a thickness of 0.3 mm to 0.7 mm, or 0.4 mm to 5.0 mm, and the edge regions may have a radius of from 0.3 mm to 0.7 mm, or from 0.4 mm to 0.5 mm.

The extrusion apparatus may comprise a heating element for heating the polymer to have at the nozzle outlet a temperature of 225° C. to 260° C., or of 235° C. to 255° C., or of 240 to 250° C.

Another aspect of the invention is directed to the use of the extrusion apparatus of any of the preceding claims in a method for making artificial turf fiber, wherein LLDPE polymer material comprising LLDPE-C8, or LLDPE-C6, or LLDPE-C4 or a combination thereof is fed through the extrusion head and processed through the extrusion head to produce artificial turf fiber that is substantially free of splitting. The extruded polymer mass at the nozzle outlet may have a viscosity as measured by a melt flow index of 0.2 to 15 g/10 min, preferably 1 to 10 g/10 min, and more preferably 2 to 5 g/10 min, a temperature of 225° C. to 260°

C., or of 235° C. to 255° C., or of 240 to 250° C., and a density of 0.86 to 0.98 g/cm³, preferably 0.89 to 0.95 g/cm3, and more preferably 0.91 to 0.93 g/cm³, wherein the pressure at the extrusion is 30 to 120 bar, preferably 50 to 100 bar, and more preferably 70 to 90 bar, and wherein the polymer mass is extruded at a speed of 100 to 600 m/min, preferably 200 to 500 m/min, and more preferably 300 to 400 m/min.

The melt flow index is measured using the ASTM D1238 standard or the ISO 1133 standard.

Another aspect of the invention is directed to a coextrusion apparatus for manufacturing a bicomponent polymer fiber, the coextrusion apparatus comprising a coextrusion head comprising a first inlet for receiving a core polymer component, a second inlet for receiving a cladding polymer component, a dual-channel nozzle having a nozzle outlet, and a coextrusion path connecting fluidly the nozzle outlet with a coextrusion head opening, the dual-channel nozzle comprising an inner channel and an outer channel encompassing the inner channel, the inner channel being in hydraulic connection with the first inlet, the outer channel being in hydraulic connection with the second inlet, the dual-channel nozzle further comprising a joining path establishing a hydraulic connection between the inner channel, the outer channel, and a nozzle outlet of the dual-channel nozzle, wherein the extrusion apparatus is characterized in that a ratio of an equivalent diameter of the nozzle outlet over an axial length of the inner channel of the nozzle is from 0.90 to 1.10, or from 0.95 to 1.05, wherein the equivalent diameter is the diameter of a circle-shape cross-section nozzle outlet having a same area as an area of the actual cross-section of the nozzle outlet.

The joining path is adapted for bringing the core polymer component and the cladding polymer component into contact with each other such that a contact layer is formed between the core polymer component and the cladding polymer component in response to simultaneously receiving the core polymer component from the inner channel and the cladding polymer component polymer from the outer channel, the contact layer comprising a mixture of the core polymer component and the cladding polymer component. In some embodiments, the coextrusion head opening may have a circle-shape or oval-shape cross-section.

In some embodiments, the joining path may have an axial length $x_1$ between the nozzle outlet and the inner channel that is 3 to 7 times the width of the inner channel (102).

In some embodiments, the inner channel may have a circle-shape cross section with a diameter between 0.5 and 1.5 mm, preferably of 1.25 mm, and the joining path may be confined by a conical taper of the dual-channel nozzle.

In some embodiments, the coextrusion head opening and the nozzle outlet may have a same shape cross section with a WTR of from 2 to 30, or from 4 to 25, or from 8 to 20.

In some embodiments, the coextrusion head opening and the nozzle outlet may each have a central opening having a concave-shape cross-section and first and second edge openings arranged symmetrically with respect to a longitudinal axis of symmetry of the inner channel nozzle, wherein the central opening of the coextrusion head opening has a constant thickness along its entire width, and wherein the first and second edge openings of the coextrusion head opening each has a shape of a circle or oval.

Another aspect of the invention is directed to the use of the coextrusion apparatus in a method for making artificial turf fiber, wherein LLDPE polymer material comprising LLDPE-C8, or LLDPE-C6, or LLDPE-C4 or a combination thereof is fed through the coextrusion head and to produce artificial turf fiber that is substantially free of splitting. The extruded polymer mass at the nozzle outlet may have a viscosity as measured by a melt flow index of 0.2 to 15, preferably 1 to 10, and more preferably 2 to 5, a temperature of 225° C. to 260° C., or of 235° C. to 255° C., or of 240 to 250° C., and a density of 0.86 to 0.98 g/cm³, preferably of 0.89 to 0.95 g/cm3, and more preferably of 0.91 to 0.93 g/cm³. The pressure at the coextrusion head may be 30 to 120 bar, preferably 50 to 100 bar, and more preferably 70 to 90 bar, and the polymer mass may be extruded at a speed of 100 to 600 m/min, preferably 200 to 500 m/min, and more preferably 300 to 400 m/min.

Yet another aspect of the invention is directed to a method for making turf fiber from LLDPE polymer material comprising LLDPE-C8, or LLDPE-C6, or LLDPE-C4 or a combination thereof that is resistant to splitting, the method comprising feeding the LLDPE to an extrusion apparatus, heating the LLDPE to a temperature above its melting point and extruding the melted LLDPE through the nozzle outlet to form a turf fiber wherein the method is characterized in that the extrusion apparatus is any of the claims.

The method may further comprise:

cooling the turf fiber as it exits the nozzle outlet of the extrusion apparatus or the coextrusion head opening of the co-extrusion apparatus first in ambient temperature air and then by passing the turf fiber through a water bath, after the water bath, subjecting the solidified fiber to a drawing process for orienting the polymer molecules and obtaining a fiber with the desirable diameter and performance characteristics.

The drawing process may involve reheating the polyethylene fiber to a temperature and subjecting the fiber to tension or pulling forces in a controlled manner via a set of rollers operating at different speeds for stretching or drawing of the fiber for aligning the individual polymer chains more closely and in more parallel arrangement to obtain a fiber with the desired size, stiffness, crystallinity, and performance characteristics.

The artificial turf fiber obtained by the method is substantially free of fiber splitting.

These and other features and advantages of the present invention will become better understood from the following detailed description of the invention in conjunction with the accompanying drawings.

BRIEF DESCRIPTION OF THE DRAWINGS

In the following, embodiments of the invention are explained in greater detail, by way of example only, making reference to the drawings in which.

DETAILED DESCRIPTION OF THE INVENTION

Up to now monofilament single component turf fibers or bicomponent turf fibers from LLDPE-C4 which has shorter side chains than LLDPE-C6 and LLDPE-C8 suffer from significant splitting of the fibers and, therefore, it has not been used extensively even though it is less expensive than LLDPE-C6 and LLDPC-8. It has been found rather unexpectedly that by shortening the length of the extrusion nozzle, the polymer fibers are less susceptible to splitting. As a result, by using a shorter nozzle even LLDPE-C4 can be used to make artificial turf fibers with reduced splitting or essentially free of splitting. It is believed that this improvement may be attributed to a less oriented and more entangled state of the polymer molecules at the time when they exit the shorter nozzle and before fiber solidifies and crystallizes. In particular, the polymer molecules are less oriented along the longitudinal axis of the extrusion nozzle.

Figures 1A, 1B:
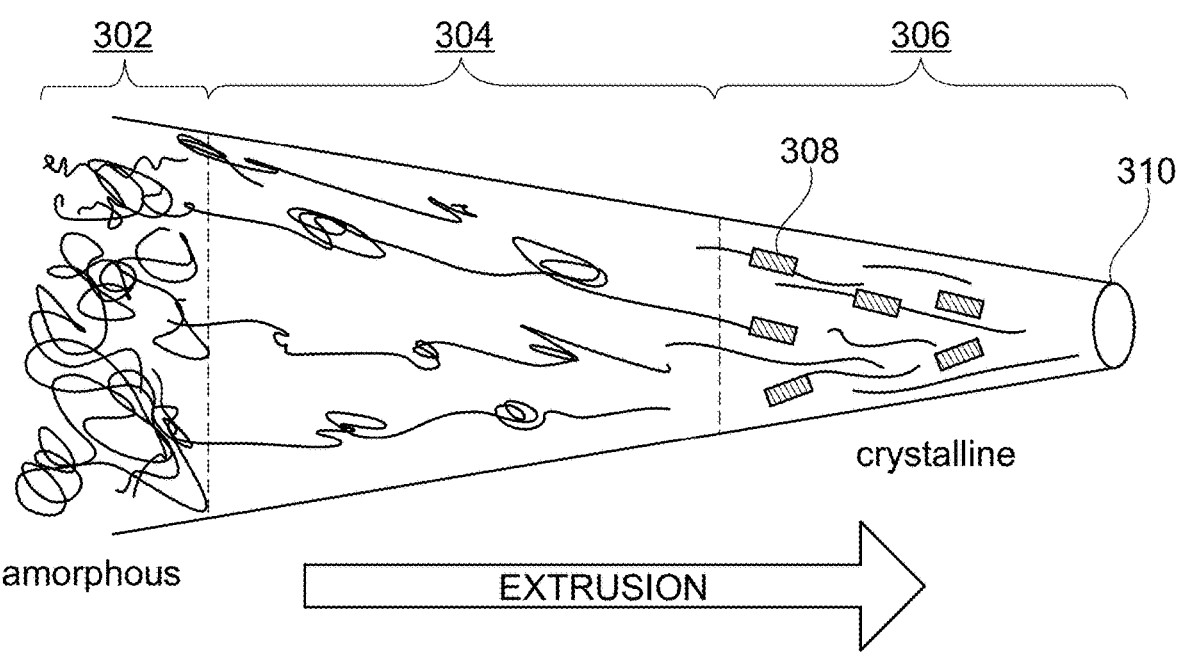
FIG. 1A shows a section through an area within a cylindrical extrusion nozzle and a circle-shape nozzle outlet.
FIG. 1B illustrates an embodiment of a large WTR nozzle outlet for making artificial turf fiber from LLDPE.

FIG. 1A shows a section through an area within a cylindrical extrusion nozzle. It is noted that FIG. 1A shows a nozzle having tapered side walls but the concept described regarding the alignment of the polymer molecules applies also for other shape nozzles, such as, for example, non-tapered cylindrical nozzles. Specifically, in a first area 302, the polymers of a liquefied polymer mixture are mostly in an amorphous state, i.e., there are only few or no crystalline regions and the polymer molecules do not show any preferred orientation in one dimension. In a second area 304 that corresponds to an area of decreased shear forces, the polymer molecules are sheared and pulled at least partially in the direction of the outlet 310 of the nozzle. In the area 306 corresponding to even higher shear forces, the LLDPE are at least partially disentangled, oriented and form crystalline portions 308. Thus, it is believed that by shortening the axial length of the nozzle the polymer molecules exiting the outlet 310 of the extrusion nozzle are less aligned along the longitudinal axis of symmetry of the capillary channel of the nozzle and are more oriented away from a direction that is parallel to the longitudinal axis of symmetry of the capillary channel of the nozzle. The polymer molecules may also be in a more entangled state as they exit the outlet 310 of the nozzle.

More specifically, it has been found that for any given equivalent diameter of the nozzle outlet, and for LLDPE the axial length of the inner channel of the nozzle should have a length that satisfies the ratio of the equivalent diameter of the nozzle outlet over the axial length of the inner channel of the nozzle from 0.90 to 1.10, or from 0.95 to 1.05. This ratio may change for different polymer materials.

The outlet of the nozzle may have a cross-section with different shapes including but not limited to a circle, oval, C shape, $2 shape and the like. The invention is not limited by the shape of the outlet opening and is particularly beneficial for producing polymer fibers from LLDPE, and, in particular LLDPE-C4 that is resistant to or free from the splitting problem.

FIG. 1B illustrates an embodiment of a nozzle having a large WTR shape nozzle outlet 1 employed in the production of artificial turf fiber having a curved shape (C-shape) with side edge ridges. More specifically, FIG. 1B shows a cross-sectional view of the extrusion outlet 1 taken at a right angle to the axis of symmetry of a nozzle 3.

Figure 2:
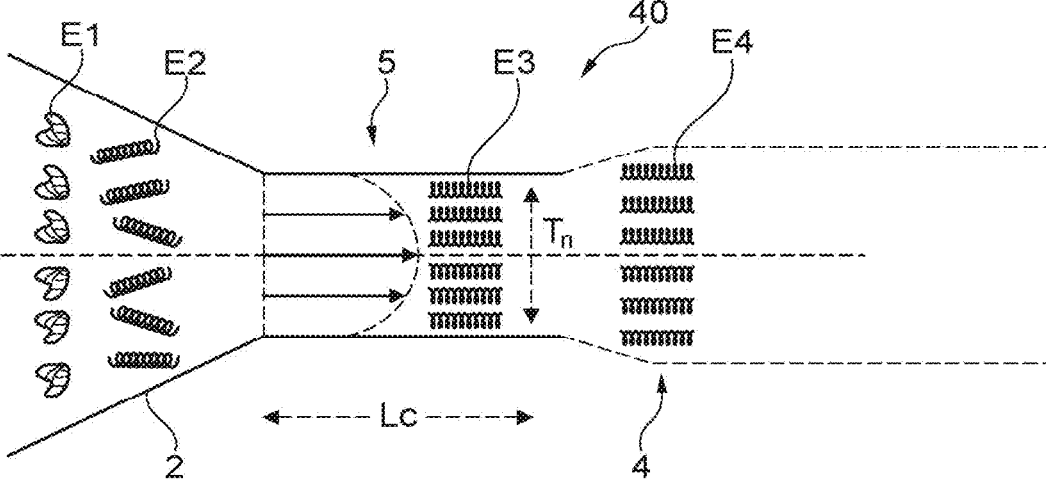
FIG. 2 illustrates a side cross-sectional view of a conventional single channel nozzle.
Figure 3:
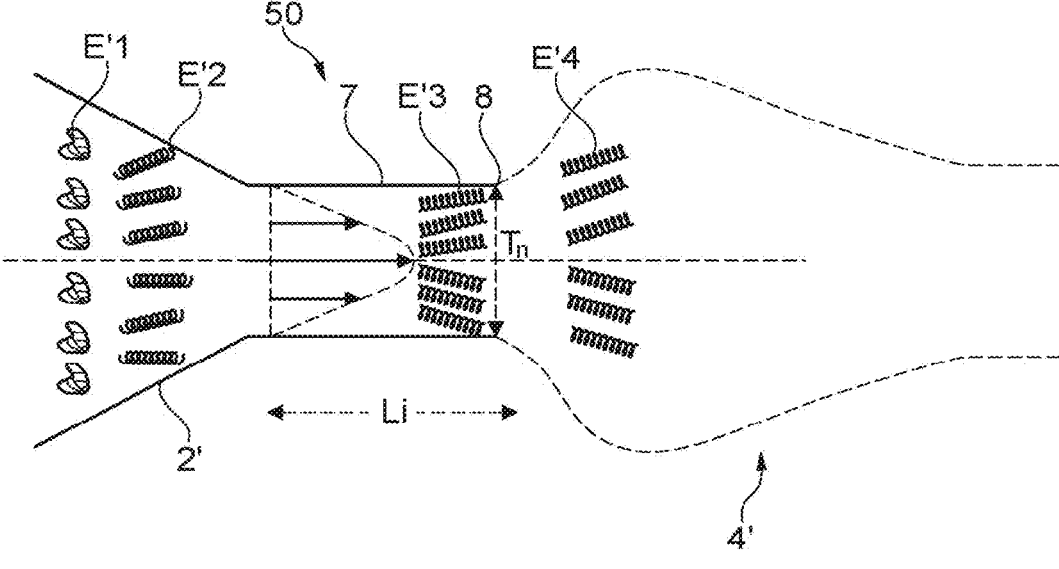
FIG. 3 illustrates a side cross-sectional view of an inventive single channel nozzle having a shorter axial length compared to the conventional single channel nozzle of FIG. 2.

FIG. 2 illustrates a side cross-sectional view of a conventional channel nozzle 5 and FIG. 3 illustrates an inventive channel nozzle 7 having a shorter axial length "L" compared to the axial length of the conventional channel nozzle "L" of FIG. 2. FIGS. 2 and 3 also provide a simplified schematic representation of the entanglement and orientation phenomena of the polymer molecules as they are processed through the channel nozzles 5 and 7. Both nozzles 5 and 7 may employ a circle-shape nozzle outlet.

Heretofore, LLDPE-C8 polymer and to some degree also LLDPE-C6 are preferred for making turf fibers because the less expensive LLDPE-C4 polymer produces turf fiber prone to splitting when a conventional nozzle is used.

Hence, the challenge has been that the turf fibers may become unraveled due to the individual fibers splitting along their longitudinal axis, especially when the less expensive LLDPE-4 is used. The present invention solves this technical problem by decreasing the axial length of the nozzle.

It has been found that for any given nozzle equivalent diameter (which is dictated by the desired equivalent diameter of the turf fiber) reducing the axial length of the nozzle so that the ratio of the equivalent diameter of the nozzle outlet over the axial length of the inner channel of the nozzle is from 0.90 to 1.10, or from 0.95 to 1.05 prevent the splitting problem observed with LLDPE and in particular the LLDPE-C6 and LLDPE-C4.

The artificial turf fiber formed by exiting the polymer through the nozzle outlets may also have a circle-shape cross section but with a larger diameter because the polymer fiber expands as it leaves the outlet before it solidifies. The expanded polymer fiber is indicated by numerals 4, 4' in FIGS. 2 and 3, respectively. The polymer molecules are subjected to increased transverse shear forces as they pass through the nozzle outlet 8 which may cause the fibers to split. Heretofore, the splitting problem has been avoided by employing the more expensive LLDPE-C8 polymer. The present invention resolves the splitting problem by a rather simple modification of the extrusion apparatus which quite unexpectedly eliminates the splitting problem previously observed in particular with the less expensive LLDPE-C4 polymer.

Specifically, the modification includes reducing the length Li of the channel nozzle 7 compared to the length Lc of the conventional nozzle 5 while keeping the diameter (also referred to as thickness or width) of the nozzle outlet 8 constant.

In a specific example, for a circle-shape nozzle outlet as the one showed in FIG. 3 having a diameter of 2.5 mm, the axial length of the nozzle is reduced to a length Li of 2.27 to 2.77.

In the following table the axial lengths of the nozzle for typical equivalent diameters are provided. Modifying the extrusion apparatus to have a nozzle having an axial length within these ranges results in turf LLDPE-C4 fiber that is free of fiber splitting.

9

| Equivalent Diameter (mm) | Axial length of the capillary channel of the nozzle for preventing fiber splitting (mm) |
|---|---|
| 2.50 | 2.27 to 2.78 |
| 2.18 | 1.98 to 2.42 |
| 2.0 | 1.82 to 2.22 |
| 1.5 | 1.37 to 1.67 |
| 1.0 | 0.91 to 1.11 |

Although we do not wish to be bound by any theory, it is postulated that decreasing the axial length Li of the capillary channel of the nozzle 7 allows the polymer molecules to have a more entangled state and an orientation further away from the longitudinal direction before reaching the nozzle outlet, and because of this more entangled state and different orientation of the polymer molecules the turf fiber produced is resistant to splitting.

A simplified schematic representation of the orientation of the polymer molecules as the polymer is moving from an inlet region 2, 2' of the extrusion head through the capillary channel of the nozzle 5, 7, and out into the expansion region 4, 4' is denoted with E1-E4 for the conventional extrusion head 40 of FIG. 2 and with E'1-E'4 for the inventive extrusion head 50.

Referring to FIG. 2, in the inlet of the extrusion head 2 the polymer molecules are in an entangled state E1, and as they converge toward the inlet of the capillary channel of the nozzle 5, they begin to unwind and straighten as indicated by state E2. Inside the capillary channel of the nozzle 5 the polymer continues to unwind and to straighten and orient along a direction that is parallel to the longitudinal axis of symmetry of the capillary channel of the nozzle 5 as indicated by state E3. In the conventional extrusion head 40 of FIG. 2, the polymer molecules as they enter the expansion zone 4 have an orientation that is more parallel to the longitudinal axis of symmetry of the capillary channel of the nozzle 5 and as the polymer cools, they freeze in place having this more aligned orientation.

Referring to FIG. 3, in the inlet of the extrusion head 2' the polymer molecules are in an entangled state E'1, and as they converge toward the inlet of the capillary channel of the nozzle 7, they begin to unwind and straighten as indicated by state E'2. States E'1, and E'2 are substantially the same as states E1 and E2 of FIG. 2. However, inside the capillary channel of the nozzle 7, because of the reduced length of the capillary channel, the polymer molecules orient more away from the longitudinal axis of symmetry of the of the capillary channel of the nozzle 7 and remain more entangled as indicated by state E'3. The different orientation and higher entanglement are likely because of the less laminar flow obtained in the shorter capillary channel of the nozzle 7 than in the longer capillary channel of the nozzle 5. In the inventive extrusion head 50 of FIG. 3, the polymer molecules as they enter the expansion zone 4' have an orientation that is less parallel to the longitudinal axis of symmetry of the capillary channel of the nozzle 7 than in the conventional extrusion head 40 and as the polymer cools, they freeze in place having this less aligned orientation, and importantly an orientation away from the longitudinal axis of the nozzles.

The orientation E'4 may also be referred to herein as an "entangled lateral orientation" (ELO) or ELO state and is believed to be the reason of the enhanced splitting resistance observed for the polymer fiber produced by the inventive extrusion head apparatus 50.

Thus, the polymer molecules having the ELO state, may sustain increased transverse shear forces applied on the fiber to obtain a fiber more resistant to splitting even when using the less expensive LLDPE-C4 polymer material. The extruded polymer mass at the outlet 8 of the nozzle 7 may have a viscosity as measured by a melt flow index of 0.2 to 15 g/10 min, preferably, 1 to 10 g/10 min, and more preferably 2 to 5 g/10 min, a temperature of 190° C. to 250° C., preferably 200° C. to 240° C., and more preferably 210° C. to 230° C., and a density of 0.86 to 0.98 g/cm3, preferably 0.89 to 0.95 g/cm$^3$, and more preferably 0.91 to 0.93 g/cm$^3$. The pressure at the extrusion may be 30 to 120 bar, preferably 50 to 100 bar, and more preferably 70 to 90 bar. The polymer mass may be extruded at a speed of 100 to 600 m/min, preferably 200 to 500 m/min, and more preferably 300 to 400 m/min.

As the melted polymer exits the nozzle outlet 8 of the nozzle 7, the polymer expands initially more than when using the conventional nozzle 5 and then tapers to a smaller diameter.

Hence, the polymer exiting nozzle 7 undergoes a greater initial expansion than the polymer exiting nozzle 5. The greater initial expansion is believed to be caused by the ELO state of the polymer molecules. One problem that had to be overcome to allow drawing the polymer fiber at a regular drawing speed was increased polymer buildup at the area of the outlet of the nozzle. The solution was to heat the plate containing the nozzle outlet sufficiently so that the polymer leaving the outlet has a temperature of 225° C. to 260° C., or of 235° C. to 255° C., or of 240 to 250° C.

Once the polymer exits the nozzle outlet, it is subjected to cooling initially in an air zone having ambient temperature. Once, the fiber is somewhat solidified, it may then be guided through a water bath to further solidify. After the water bath, the solidified polyethylene fiber may then be subjected to a drawing process as may be needed for orienting the polymer molecules and obtaining a fiber with the desirable diameter and performance characteristics. The drawing process involves reheating the polyethylene fiber below its glass transition temperature and subjecting the fiber to tension or pulling forces in a controlled manner. For example, the reheated fiber may be guided via a set of rollers operating at different speeds for stretching or drawing of the polyethylene fiber for aligning the individual polymer chains more closely and in more parallel arrangement to obtain a fiber with the desired size, stiffness, crystallinity, and performance characteristics. Conventional process conditions for the downstream treatment of the polymer fiber exiting the nozzle outlet may be used.

Figure 9:
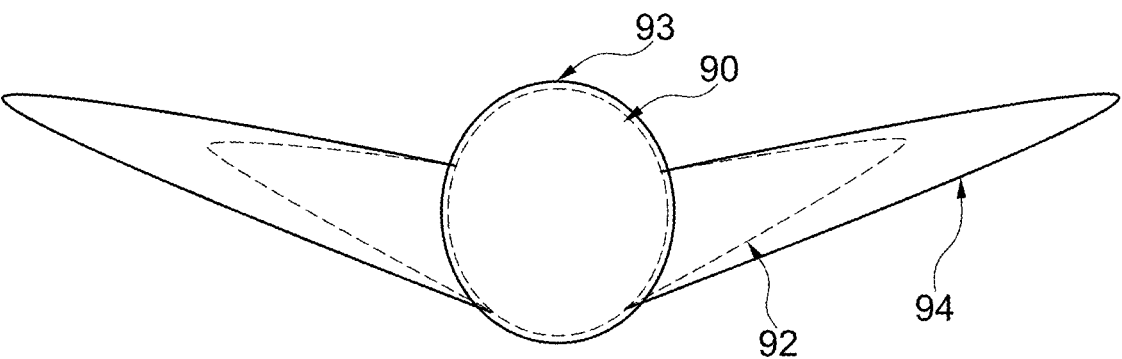
FIGS. 9 and 10 illustrate some shrinkage in the dimensions of the final fiber (indicated by the broken lines) compared to the dimensions of the nozzle outlet for various fiber shapes.
Figure 10:
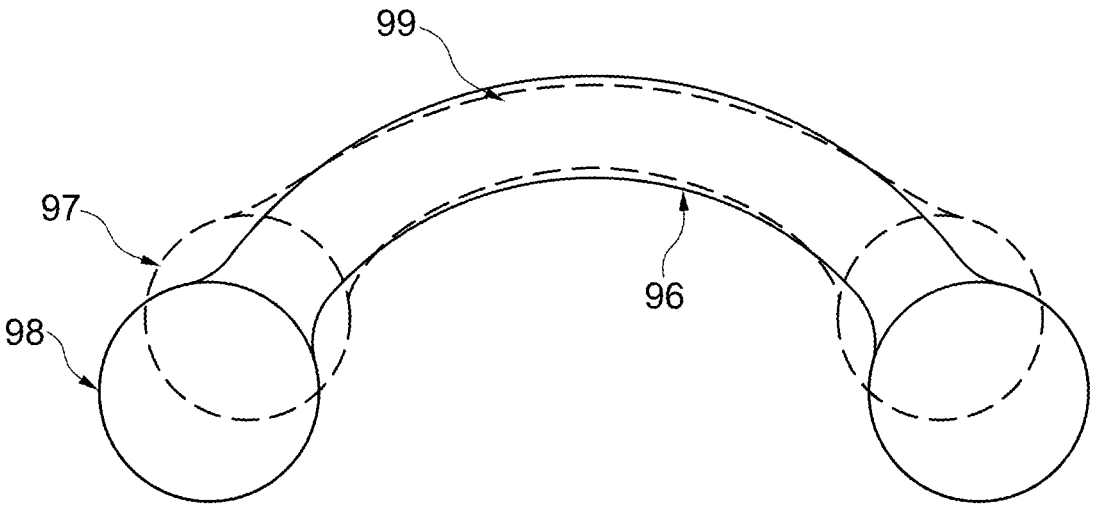

As illustrated in FIGS. 9 and 10 the dimensions of the cross-section of the produced fiber following the post-nozzle processing steps (e.g., cooling and stretching) may differ from the dimensions of the outlet of the nozzle. FIG. 9 illustrates a cross-section of a LLDPE-C4 fiber having a "wing" design comprising a central, circle-shape section 90 and wing sections 92 having a generally triangular shape. The wing-shape sections 92 are positioned left and right to the central section 90 in a symmetrical arrangement. The wing-shape design was made with LLDPE-C4 using an extrusion nozzle having a short capillary length of 2.0 mm and an outlet having a wing-shape design. As it can be seen form FIG. 9, the fiber made with the short capillary length 90, 92 (indicated with the broken lines) maintained the overall cross-sectional shape of the outlet of the nozzle 93, 94 (indicated with the solid lines) but the dimensions of the fiber cross-section compared to the dimensions of the nozzle have been reduced following the post-nozzle processing steps. FIG. 10 shows the final cross-sectional shape of a LLDPE-C4 fiber made using the same extrusion nozzle as for the fiber of FIG. 9, except that the cross-sectional shape of the outlet of the nozzle was similar to the one shown in FIG. 1B. The cross-sectional shape of the outlet of the nozzle of FIG. 10 was similar to the one shown in FIG. 1B with a curved central section 96 and circle-shape edges 98 positioned left and right to the central curved section. It can be seen that although there is some shrinkage in the dimensions of the final fiber 97, 99 (indicated by the broken lines) compared to the dimensions of the nozzle outlet, the fiber maintained the overall geometrical shape of the cross-section of the nozzle outlet despite the short capillary nozzle length.

Large WTR Nozzle Outlet

For large WTR nozzle outlets such as the nozzle outlet 1 of FIG. 1B, decreasing the length of the nozzle below a threshold value allows producing LLDPE turf fiber with large WTR that is substantially free of the splitting problem even with the LLDPE-C4 polymer.

In the embodiment of FIG. 1B, the nozzle outlet 1 of FIG. 1B comprises a central opening 20 and two side openings 10 and 30 on either side of the central opening 20. The central opening 20 has a curved cross-sectional profile. Each of the side openings 10 and 30 has a cross-sectional shape that is a circle. In the illustrated embodiment, each side opening 10 and 30 has a circle-shape cross-section with a diameter "D" of 0.85 mm. The central opening 20 of the nozzle outlet 1 has a concave curved shape with a radius of curvature "Rc" of 1.55 mm The central opening 20 has a thickness "T." of 0.46 mm and a width "W" of 3.74 mm which is the lateral distance between the farthest points of the side openings 10 and 30. Hence the width to thickness ratio WTR for the shape of FIG. 1B is equal to 3.74/0.46 or 8.1. A vertical distance between the lowest point of the curved central opening 20 and the highest point of the side openings 10 and 30 is 1.45 mm.

The artificial turf fiber formed by exiting the polymer through the nozzle outlet 1 may also have a concave large WTR shape with side edge ridges wherein the central concave part of the fiber corresponds to the central opening 20 and the side edge ridges correspond to the side openings 10, 30 of the nozzle outlet 1. The nozzle outlet 1 has been found to provide fibers that are resilient and resistant to flattening due to foot traffic. However, the nozzle outlet 1 may also subject the polymer to increased transverse shear forces which may lead to increased splitting of the formed fibers. Hence, heretofore, because of the splitting problem the more expensive LLDPE-C8 polymer material has been used preferentially for such high WTR fiber shapes. The present invention resolves the splitting problem by shortening the length of the capillary channel of the nozzle 7 which allows making turf fiber that is resistant to splitting even with the LLDPE-C4 polymer material.

Thus, the polymer molecules having the ELO (entangled lateral orientation) may sustain the increased transverse shear forces applied on the fiber to obtain a fiber with the above large WTR cross-section which is resistant to splitting even when using the less expensive LLDPE-C4 polymer material.

Generally, the decrease in length of the capillary channel of the nozzle of the extrusion head required may vary primarily depending on the equivalent diameter of the nozzle outlet, and the type of polymer material used in the extrusion. Hence, it should be understood that although specific values are provided herein for some embodiments for LLDPE, the invention is not limited to these examples and to LLPDE but could be readily adapted for other types of materials.

Dual-Channel Nozzle

The same concept of decreasing the length of the capillary channel of the nozzle for reducing splitting of the produced fiber may also be applied to bicomponent extrusion dies used for making bicomponent turf fiber. The bicomponent turf fiber may include a core fiber made from one material and an outer cladding made of a different material. A bicomponent turf fiber and extrusion die is disclosed in European patent document 3749991 to Sick et al. entitled "Polymer coextrusion head with a dual-channel nozzle."

Figure 4:
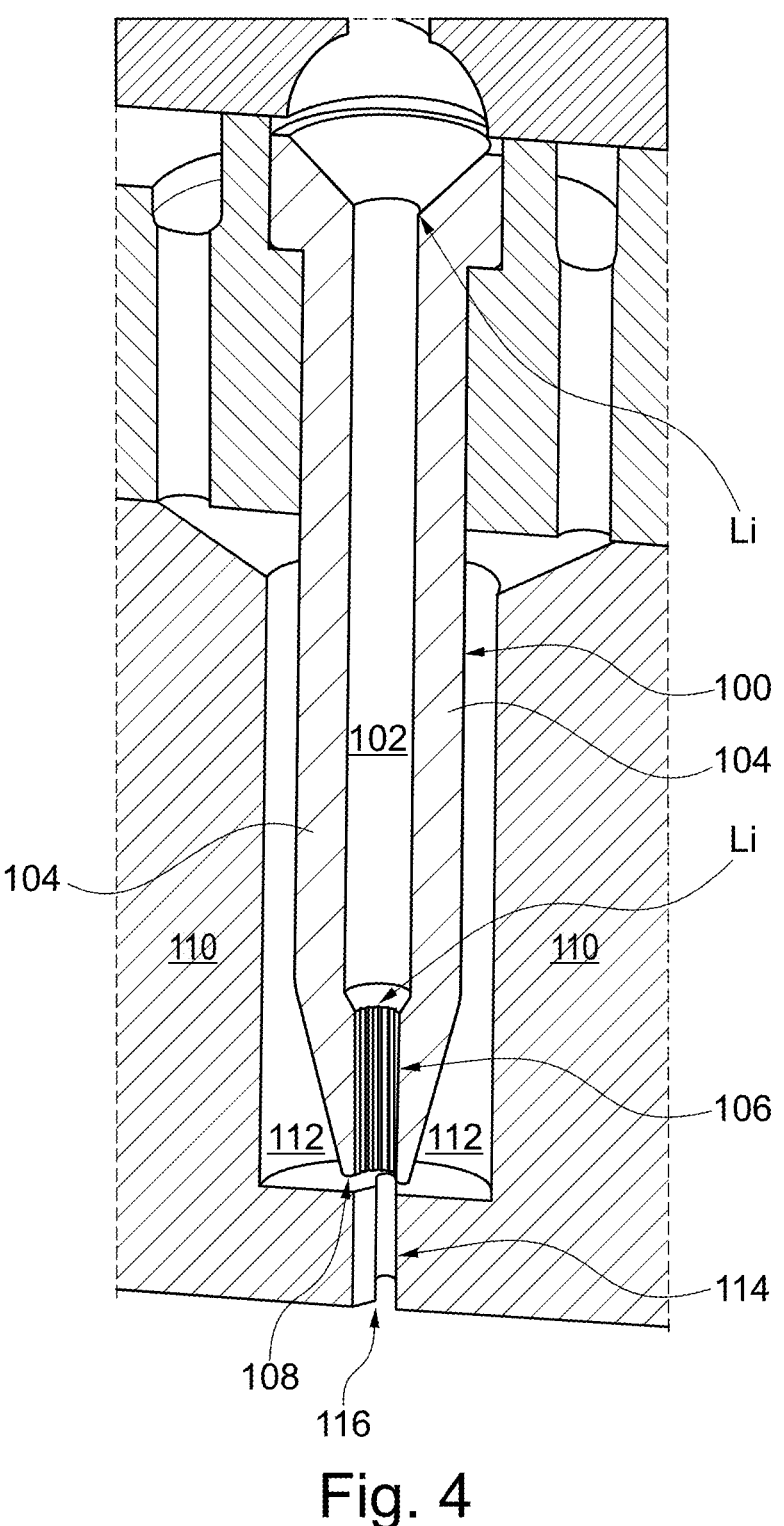
FIGS. 4 and 5 illustrate a dual channel nozzle of a dual extrusion apparatus according to an embodiment of the invention.
Figure 5:
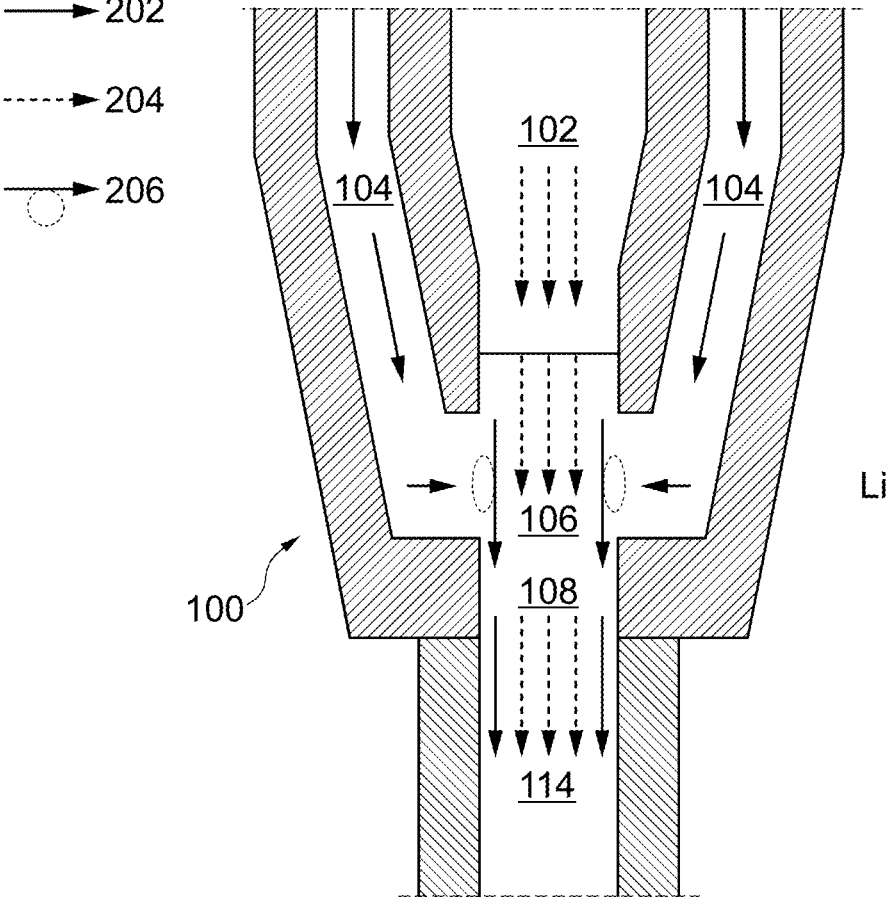

Simplified schematics of a dual-channel nozzle 100 are provided herein in FIGS. 4 and 5. FIG. 4 illustrates an example of a dual-channel nozzle 100 mounted in a cavity of a coextrusion head. The coextrusion head may be implemented as a stack of channel plates, and each cavity of the coextrusion head may be formed with a heating channel in the extrusion plate and through holes of at least one plate upstream of the extrusion plate. The through holes may be aligned with the heating channel. The dual-channel nozzle 100 may be disposed within a heating channel 112 of an extrusion plate 110 through an aligned through hole of the channel plate mounted on top of the extrusion plate 110. The heating channel 112 is adapted for further heating of the polymer and comprises a heating element (not shown) for keeping the channel nozzle 100 and the two polymer components at a predefined temperature. Heating the channel nozzle 100 may prevent adhesion of the polymer components to the walls channels 102 and 104.

The channel nozzle 100 comprises the inner channel 102 for receiving the melted core polymer component and the outer channel 104 for receiving the melted cladding polymer component. The core polymer component may be fed to the inner channel 102 through a central delivery channel of the coextrusion head, whereas the cladding polymer component may be fed to the outer channel 104 through a ring channel (as depicted in FIGS. 4 and 5) or a side channel of the coextrusion head.

A joining path 106 located at an end segment of the dual-channel nozzle 100 is hydraulically connected to the inner channel 102 and the outer channel 104. The end segment of the dual-channel nozzle 100 also comprises a tapering where the outer channel 104 is guided toward the center. The fluid core polymer component can be fed through the inner channel into the joining path 106, where it can be brought into contact with the fluid cladding polymer component by simultaneous feeding.

The flow characteristics of the core and the cladding polymer components in the joining path 106 are illustrated in FIG. 5. When LLDPE-C4 is used either as the core or the cladding material decreasing the axial length of the dual-channel nozzle may result in the polymer molecules being oriented away from the longitudinal direction which helps the bonding between the different polymer molecules in a thin contact layer formed between the core and the cladding polymers. On the other hand, too short of a nozzle may create an excessive turbulent flow 206 causing instabilities which would destroy the core-cladding structure at least locally. It has been found that the presence of some turbulence is desirable because it may result in the polymer molecules being less aligned in a direction parallel with the longitudinal axis of symmetry of the dual nozzle and instead obtain an orientation pointing more away from the direction of the longitudinal axis of the dual channel nozzle which as noted earlier improve the resistance of the turf fibers to splitting. Moreover, the more entangled orientation of the polymer molecules may improve the bonding of the core and cladding polymer molecules to make the turf fiber more resistant to delamination.

The extrusion die of FIGS. 4 and 5 may be used for making bicomponent fibers of any shape including of a circle-shape or oval-shape or of a large WTR shape wherein at least one of the components is LLDPE-C4 without a splitting problem or delamination problem by decreasing the axial length of the channels 102 and 104 of the channel nozzle 100. For example, when the core polymer in the channel 102 is LLDPE-C4, it is the length of the channel 102 that may be decreased for reducing fiber splitting. When the LLDPE-C4 is used as the cladding polymer, the length of the outer channel 104 may be decreased. However, in the bicomponent design decreasing the length of one of the channels 102 or 104 may also result in a decrease of the other channel to at least some extent to ensure that an adequate length is provided for the joining path 106.

In operation, the strand of joined components is pressed out of the joining path 106 through the nozzle outlet opening 108 into a coextrusion path 114 which ends in a coextrusion head opening 116. The contour of the coextrusion head opening 116 corresponds to the contour of the nozzle outlet opening 108 and to the perimeter of the bicomponent polymer fiber to be produced.

In some embodiments, the coextrusion head opening 116 may have a circle-shape. In some other embodiments, the coextrusion head opening 116 may have the cross-sectional shape of FIG. 1B. In yet some other embodiments, the coextrusion head opening 116 may have two circle-shape or ellipsoidal sections which are located on two opposite sides from the extended central axis of the channel nozzle 100 and which are connected to each other via two long, narrow protrusion gaps located on two further opposite sides from the central axis. The circle-shape or ellipsoidal sections of the coextrusion head opening 116 have a radius which is larger than the radius of the core strand leaving the channel nozzle 100. Hence, the center of the joined strand pressed through the coextrusion head opening 116 may comprise the core strand surrounded by circle-shape or ellipsoidal sections of the cladding. The protrusion gaps are filled by the cladding polymer component only.

In addition to the flow characteristics in the joining path 106, turbulence must also be controlled in the coextrusion path 114. The coextrusion path 114 extends from the rim of the channel nozzle 100 to the bottom of the coextrusion head opening where the joined strand leaves the coextrusion head as a bicomponent fiber. A turbulent flow is permissible here as it may cause the cladding to fill the protrusion gaps uniformly and completely up to their outer corners, which cannot be achieved with a purely laminar flow. However, too strong turbulence is not desirable as it may destroy the contact layer just formed in the joining path 106.

The flow characteristics in the joining path 106 and in the coextrusion path 114 are also influenced by design parameters of the coextrusion head. For instance, the length x1 of the joining path 106 may be selected according to the specific combination of polymer materials which are to be processed by the coextrusion setup. A parameter which similarly depends on the specific combination of polymers and which may allow for controlling the flow characteristics in the coextrusion path 114 independently from the joining path 106 is the length x2 of the coextrusion path 114.

The coextrusion head may be implemented with a design which supports the dual-channel design of the channel nozzles 100. Preferably, the coextrusion head is a heated plate coextrusion head or spinneret plate where each of the two components is distributed through hierarchical channels towards a series of coextrusion head openings 116 where a plurality of bicomponent fibers can be produced in parallel.

The joining path 106 is adapted for forming a contact layer between the core and the cladding. The contact layer consists of a mixture of the core polymer component and the cladding polymer component. During production of the bicomponent polymer fiber, the two components are heated to a liquid state. The joining path 106 is designed such that, when these two miscible polymers come into contact, they mix with each other in an interfacing zone herein referred to as "contact layer". When the bicomponent fiber precursor thus formed is cooled down, the two polymers solidify so that the contact layer forms a solid connection between both components which is void of any contact surface. The contact layer forms a three-dimensional structure which may comprise a gradual transition of polymer types, i.e., the number density of molecules of the core polymer component gradually decreases from the core outward and the number density of molecules of the cladding polymer component analogously decreases from the cladding inward. In the special case of identical core and cladding polymers, the number density of polymer molecules remains constant, while only the concentration of additives, which may be present in only one of the interfacing components, forms a gradient towards the respective other component.

In some embodiments, for the dual channel nozzle 100 at least one of the polymers used may be LLDPE-C4. For example, the core polymer material (also referred to as a first polymer material) may be LLDPE-C4. The cladding polymer material (also referred to as a second polymer) material may be any other suitable polymer including, for example, LLDPE-C6, LLDPE-C8, LDPE, polypropylene, nylon, polyethylene terephthalate and the like. The dual channel nozzle 100 of the present invention having the decreased channel length for the inner and outer channels 102 and 104 is particularly suitable in manufacturing turf fiber having a large WTR shape turf fiber having at least one of the core or the cladding being LLDPE-C4.

In addition to preventing fiber splitting, decreasing the length of the dual channel nozzle also improves the inter-mixing between the core and the cladding polymers preventing delamination. More specifically, intermixing in the joining path 106 of the core and cladding polymers is improved to form a contact polymer mixture layer wherein substance-to-substance bonds formed in the polymer mixture hold together the intermixed polymers. In the contact layer, the molecules of the two polymers are bonded together by topologic entanglement which is improved substantially with a shorter axial length of the dual channel nozzle. Hence, a bicomponent fiber produced exhibits improved resistant to shear stress acting in the axial direction of the fiber and is more resistant to core-cladding delamination and, also to fiber splitting.

In some embodiments, the axial length $x_2$ of the coextrusion path 114 may be selected such that the cladding fills the non-circle-shape cross section at the extrusion opening. This may allow for adjusting the length of the coextrusion path to an optimum which is long enough to enable the cladding to fill the contour of the extrusion opening completely and to assume a directed flow in axial direction over the whole cross section of the opening, but as short as possible to minimize friction loss. This may contribute to the smooth-ness and stability of the outer cladding surface of the finished polymer fiber leaving the extrusion opening.

The axial length $x_2$ of the coextrusion path 114 may vary dependent upon the viscosity of the coextruded polymer strand and the process parameters. A polymer with a low viscosity at a design process temperature may need a shorter coextrusion path as it fills the contour of the extrusion opening more easily than a high-viscosity polymer. Especially if the two components are coextruded at different feed rates, the length of the coextrusion path may be adapted to an effective viscosity of the coextruded polymer strand as a whole rather than the viscosity of the pure cladding polymer component because laminar core-cladding interaction may influence the space required for filling the contour.

According to some embodiments, the axial length $x_1$ of the joining path 106 may be between 5 and 50 percent of the axial length $x_2$ of the coextrusion path 114. For a given choice of polymer component materials and design process parameters, independently determined ideal path lengths $x_1$ and $x_2$ may typically have a ratio within this range. Therefore, the design of the coextrusion head may be simplified, e.g., by selecting a suitable joining path length $x_1$ for the chosen polymer component materials and design process parameters from the $x_1$ range stated further above, and deriving a matching coextrusion path length $x_2$ using a suitable ratio from said range. A smaller ratio $x_1 : x_2$ may be beneficial when laminar core-cladding interaction in the coextrusion path leads to a larger effective viscosity of the coextruded polymer strand compared to the viscosity of the pure cladding polymer component, and vice versa.

The single extrusion head (also referred to simply as extrusion head) and coextrusion head may produce cylindrical polymer fibers, where the term "cylindrical" denotes a general right cylinder, i.e., having its primary axis oriented perpendicular to its base plane or cross section. The extrusion head and coextrusion head may also produce non-cylindrical polymer fibers, i.e., having a non-circle-shape cross section. Examples of a non-circle-shape cross section include an oval, ellipse, a rectangular shape, a polygon shape, a triangular shape, a V shape, a W shape a C shape, an $\Omega$ shape and any combinations thereof. The extrusion head and coextrusion head are particularly suitable for producing large WTR fiber blades with or without side edge ridges, wherein the side edge ridges are of rectangular, oval, or circle-shape.

For the bicomponent fibers, it is understood that the cross sections of the core and the cladding components may be selected independently from each other, and that each of the core and the cladding may have a circle-shape, oval-shape, or one of the WTR non-circle-shape cross-sections.

Referring to FIGS. 4 and 5, the nozzle 100 comprises an inner channel 102 for receiving the melted core polymer component and an outer channel 104 for receiving the melted cladding polymer component. The core polymer component may be fed to the inner channel 102 through a central delivery channel of the coextrusion head, whereas the cladding polymer component may be fed to the outer channel 104 through a ring channel or a side channel of the coextrusion head.

A joining path 106 located at an end segment of the dual-channel nozzle 100 is hydraulically connected to the inner channel 102 and the outer channel 104. The end segment also comprises a tapering where the outer channel 104 is guided toward the center. The fluid core polymer component can be fed through the inner channel 102 into the joining path 106, where it can be brought into contact with the fluid cladding polymer component by simultaneous feeding.

The strand of joined components is pressed out of the joining path 106 through capillary nozzle outlet 108 into a coextrusion path 114 which ends in a coextrusion head opening 116. The contour of the opening corresponds to the perimeter of the bicomponent polymer fiber to be produced.

In addition to the flow characteristics in the joining path 106, turbulence must also be controlled in the coextrusion path 114. The coextrusion path 114 extends from the rim of the nozzle 100 to the bottom of the coextrusion head opening where the joined strand leaves the coextrusion head as a bicomponent fiber. A turbulent flow is permissible here as it may cause the cladding to fill the protrusion gaps uniformly and completely up to their outer corners, which cannot be achieved with a purely laminar flow. However, too strong turbulence is not desirable as it may destroy the contact layer just formed in the joining path 106.

Figure 6:
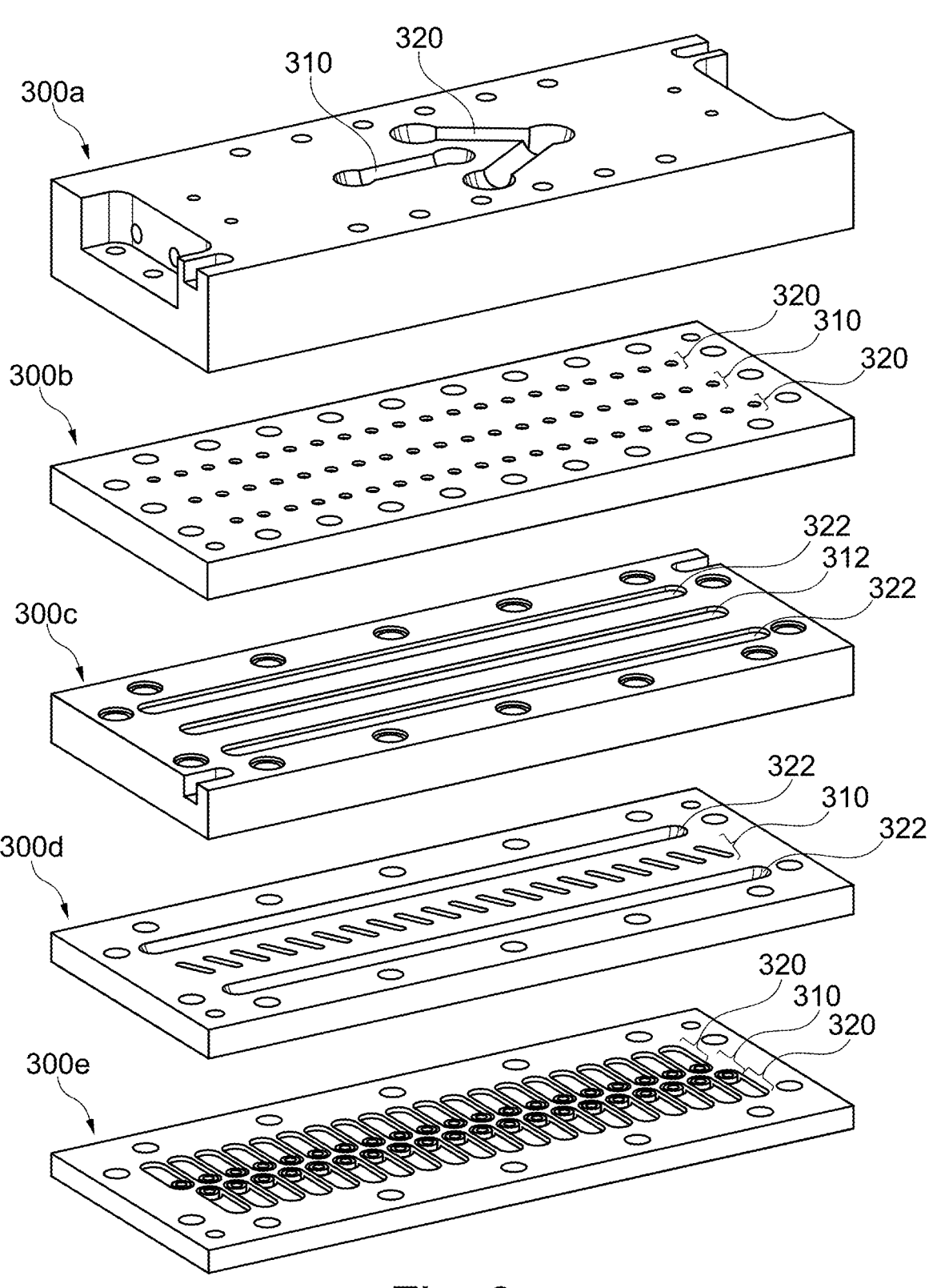
FIG. 6 is a CAD (Computer-Aided Design) cut through a coextrusion head illustrating first channels in a hierarchical design.
Figure 7:
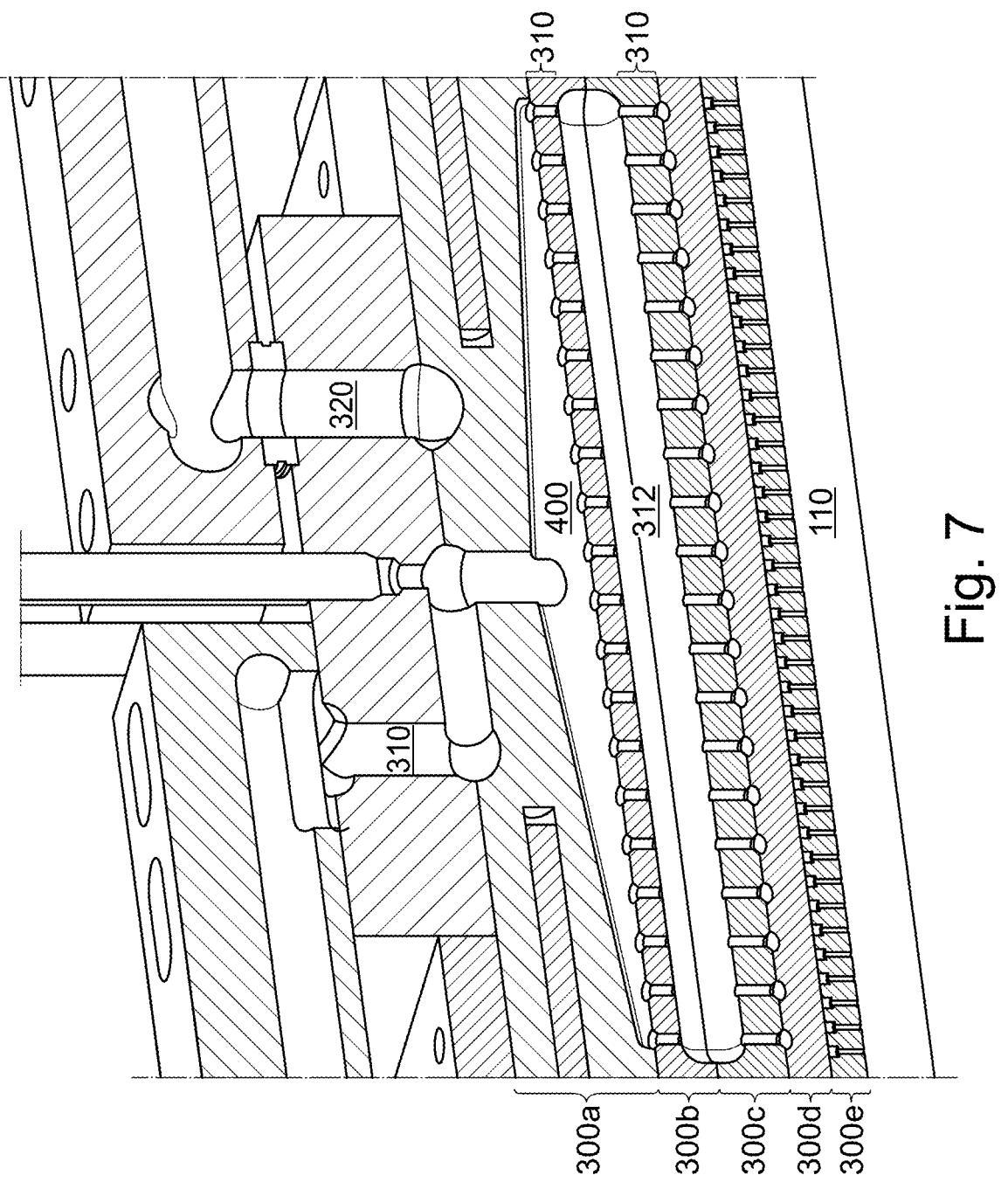
FIG. 7 is a CAD cut through a coextrusion head illustrating second channels in a hierarchical design.
Figure 8:
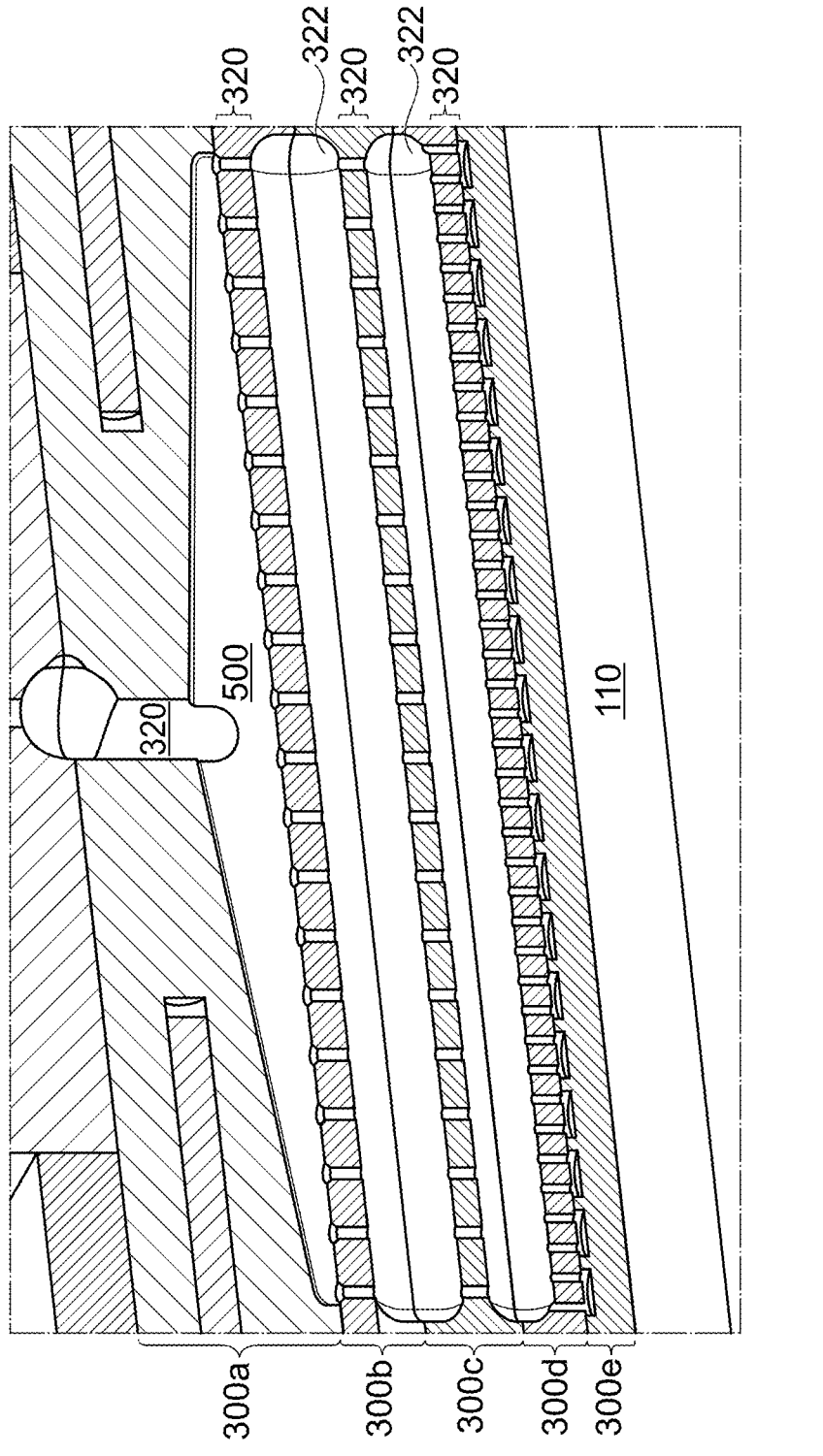
FIG. 8 demonstrates the flow of fluid core polymer component and fluid cladding polymer component during coextrusion.

FIGS. 6 to 8 illustrate an exemplary design of a coextrusion head assembly comprising a stack of channel plates 300. FIG. 6 shows an exploded view of a set of channel plates 300 for distributing the two polymer components to twenty coextrusion nozzles. Each channel plate 300 comprises channels of a defined width or width which connect either the first inlet (not shown) with the inner channel 102 of each dual-channel nozzle 100 or the second inlet (not shown) with the outer channel 104 of each dual-channel nozzle 100. The two channel types are responsible for distributing each of the two flow streams from the inlets with a large width to the small coextrusion head openings 116, wherein the large width corresponds to system parameters of mentioned single-component extrusion units upstream the coextrusion head and the dimensions of the extrusion openings correspond to the radial dimensions of the bicomponent polymer fibers to be produced, which are typically in the micrometer to millimeter range.

In order to distribute the two flow streams to the coextrusion head openings 116 with a homogeneous pressure distribution, the plates 300 are mounted upon each other with the channels arranged in a manner which enables a subsequent flow of the components through all channel plates 300, hence establishing a hierarchical order where the first channel plate 300a comprises channels with the largest width, followed by the second plate 300b with smaller channel widths than the first, but still larger than the third, etc. The last channel plate 300 comprises the channels for both components in dimensions which are close to those of the channels 102, 104 inside the dual-channel nozzles 100 which are mounted in an extrusion plate 110 downstream the last channel plate 300, the channels ending in the center, ring and/or side delivery channels mentioned above.

The pressure of each polymer component can be equalized further between the coextrusion nozzles 100 by providing pressure chambers 312, 322 in at least one of the channel plates 300. On one hand, each component is supposed to be distributed from large to small widths in order to obtain bicomponent polymer fibers with the desired dimensions. This may lead to decreased interaction as the surface-to-mass ratio decreases with every hierarchy step. On the other hand, the coextrusion nozzles 100 span at least one width of the coextrusion head, i.e., the nozzles 100 cover a cross-sectional area which is larger than the inlet widths. The mentioned surface effects may thus lead to a smaller pressure at the outer channels of the head.

Furthermore, it is desirable to spread the mass flow between subsequent plates 300 into as many parallel channels as possible to simplify and miniaturize the design of the coextrusion head. This may intensify surface forces between subsequent plates 300, preventing a homogeneous pressure distribution.

A pressure chamber 312, 322 may effectively compensate for the described surface selective pressure loss by offering the liquid polymers additional space in flow direction to achieve a vertical equalization of local pressure in outlet channels of the pressure chamber. The outlet channels can be on the same or the next smaller hierarchy step; a return to larger channel dimensions would be a design inefficiency as this would counteract the hierarchical channel structure.

The exemplary coextrusion head of FIGS. 6 to 8 uses the five channel plates 300a to 300e shown in FIG. 6 to distribute the two polymer components to forty dual-channel nozzles 100. Mass flow is directed from the first plate 300a at the top of FIG. 6 to the fifth plate 300e at the bottom. The first plate 300a receives the core polymer component with the straight left channel on the upper side and the cladding polymer component at the tip of the "V" shaped right channel visible on the upper side.

The straight channel is a first channel 310 and continues as a vertical feed to the first 1:20 distribution chamber 400 seen as a hanger-shaped structure in FIG. 7. From first to fourth plate 300d, the first channels 310 stay in the center of the plates 300, i.e., the central line of twenty channels on the second plate 300b are first channels 310, connecting to the central pressure chamber 312 on the third plate 300c which is discharged by twenty further first channels 310 in the third plate 300c. On the bottom of the third plate 300c, each of the twenty first pressure chamber discharge channels divides into two small channels which connect to the circle-shape feed holes on the fifth plate 300e for the inner channels 102 of the dual-channel nozzles 100.

The "V" shaped channel on the first plate 300a is a second channel 320 and continues as two vertical feeds to the second 1:20 distribution chambers 500 at the front and, respectively, the back side of the first plate 300a. Another cut through the CAD model is shown in FIG. 8 to visualize the layout of second channels 320 in the rear system. The twenty second channels 320 of the second plate 300b connect to an upper pressure chamber 322 on the third plate 300c which is discharged by twenty further second channels 320 in the third plate 300c. However, the cladding polymer must be distributed into the outer channels 104 of the dual-channel nozzle 100.

As can be seen in FIG. 5, each outer channel 104 surrounds the inner channel 102 of the respective nozzle 100, and it is desirable to maintain a mass flow with equalized pressure also along the whole perimeter of the outer channel 104. Therefore, the upper pressure chamber 322 connects to a lower pressure chamber 322 on the fourth plate 300d which is discharged by forty second channels 320, each two of which supplying the cladding polymer component to one of the flat feed channels on the fifth plate 300e which each lead to one of the ring channels for feeding the outer channel 104 of one dual-channel nozzle 100.

Another beneficial effect of a channel plate design may be a simplified cleaning procedure where the plates 300 are detached from each other and cleaned at e.g., 750° C. in a pyrolysis oven. The hierarchical channels may be manufactured with dimensional tolerances allowing for proper realignment of the plates 300 when being put together e.g., after maintenance or cleaning. The dual-channel nozzles 100 may further support this flexibility when implemented as exchangeable parts which can be pushed through holes in the last channel plate 300 for being inserted into the heating channels 112 of the extrusion plate 110 downstream the last channel plate 300 upon (re-)assembly of the coextrusion head.

EXAMPLES

The extrusion heads 40 and 50 as shown in FIGS. 2 and 3 were used for the formation of LLDPE-C4 monofilament fiber. The outlet 8 of nozzles 5 and 7 had a circle-shape cross-section of 2.5 mm diameter. The axial length Lc of the capillary channel of the nozzle 5 was 15 mm, the conical inlet region 2 of the extrusion head 40 had a length of 20 mm and an angle of tapering "a" of 40 degrees. The formation of the LLDPE-C4 fiber with the extrusion head 40 is referred to as comparative example 1 (C-Ex. 1).

The dimensions of the extrusion head 50 and of the nozzle 7 were identical to the extrusion head 40 and nozzle 5 except that the axial length Li of the capillary channel nozzle 7 was 2.3 mm. The formation of the LLDPE-C4 fiber with the extrusion head 50 is referred to as example 1 (Ex. 1).

The extruded polymer mass at the outlet 8 of the nozzle 7 had a melt flow index of 3.5 g/10 min, a temperature of 240° C., and a density of 0.92 g/cm³. The pressure at the extrusion was 80 bar and the polymer mass was moving at a speed of 350 m/min. The formed turf fiber from comparative example 1 suffers from splitting while turf fiber from example 1 exhibits no splitting.

In comparative example 2 (C-Ex. 2), the same extrusion head 40 was used as in comparative example 1 for making LLDPE-C4 fiber, however, the nozzle outlet used had the large WTR outlet profile of FIG. 1B with an equivalent diameter of 2.18 mm and a WTR of 8.13 (calculated by dividing the width over the thickness 3.74/0.46). The axial length of the nozzle in comparative example 2 was 5 mm.

In example, 2 the same extrusion head 50 was used as in example 1 for making LLDPE-C4 fiber of FIG. 3, however, the nozzle outlet used had the large WTR outlet profile of FIG. 1B with an equivalent diameter of 2.18 mm and a WTR of 8.13. The axial length of the nozzle in example 2 was the same as in example 1, i.e., 2.3 mm and allowed processing the less expensive LLDPE-C4 material to produce turf fiber without any fiber splitting observed. In contrast the polymer fiber of comparative example 2 suffered from fiber splitting.

FURTHER EXAMPLES

Example 1 was repeated in examples 1-1, 1-2, and comparative examples C-Ex. 1-1 and C-Ex. 1-2 identical as in example 1 except that different axial lengths of capillary channel of the nozzle and different temperatures of the polymer at the nozzle outlet were tested. In comparative example C-Ex. 1-3 the example 1 was repeated, however the temperature of the polymer at the nozzle outlet was lowered to 220° C. The lower temperature resulted in processing problems including polymer buildup at the nozzle outlet. By contrast, at the higher polymer temperatures of 235 (Ex. 2), 240 (Ex, 1), and 245 (Ex. 1-1) no such buildup was observed. The results are shown in Table 2.

TABLE 2

| | Eq. D. (mm) | Cap. L. (mm) | Polymer T(° C.) at outlet nozzle | Fiber splitting | PROCESSING | Ratio Eq. D/Cap.L. |
|---|---|---|---|---|---|---|
| Ex. 1 | 2.5 | 2.30 | 240 | NO | G | 1.09 |
| Ex. 1-1 | 2.5 | 2.50 | 245 | NO | G | 1.0 |
| Ex. 1-2 | 2.5 | 2.78 | 225 | No | G-minor polymer buildup | 0.90 |
| C-Ex. 1-1 | 2.5 | 2.0 | 240 | NO | N-G | 1.25 |
| C-Ex. 1-2 | 2 . . . 5 | 3.0 | 240 | YES | G | 0.83 |
| C-Ex. 1-3 | 2.5 | 2.5 | 220 | NO | N-G, polymer buildup | 1.0 |
| C-Ex. 1 | 2.5 | 15 | 220 | YES | G | 0.16 |
| Ex. 2 | 2.18 | 2.3 | 235 | NO | G | 0.95 |
| C-Ex. 2 | 2.18 | 5 | 240 | YES | G | 0.44 |

The results of table 2 show that for LLDPE-C4 when the axial length of the channel of the capillary nozzle (referred to in the table 1 as capillary Length "Cap. L.") is reduced sufficiently so that the ratio of the equivalent diameter to the axial length of the nozzle is from 0.90 to 1.1 then the fiber splitting is eliminated and overall processing of the LLDPE-C4 polymer in the extrusion head and, also, of the turf fiber downstream of the nozzle outlet is good and no processing issues were observed.

Also, polymer buildup was observed when the temperature of the polymer at the nozzle outlet was 220° C. which Is not experienced at conventional nozzle lengths. By heating the plate of the nozzle outlet sufficiently to obtain higher polymer temperature at the nozzle outlet this problem was overcome. See Table 1, Ex. 1.2.

Although the invention has been described in reference to specific embodiments, it should be understood that the invention is not limited to these examples only and that many variations of these embodiments may be readily envisioned by the skilled person after having read the present disclosure.

It should be understood, that the above specific values for the various parameters of the described nozzles and nozzle outlets are just examples of the present invention, and that the skilled person would be able to envision many other combinations of parameters satisfying the claimed ranges for the various parameters as defined in the summary of the invention and in the claims.

Moreover, it should be understood that although the invention has been described in more detail for specific shape nozzle outlets, the invention is not limited to these shapes, and dimensions of the nozzle outlet. As it can be readily understood by the skilled person, the inventive concept of improving or eliminating the turf fiber splitting problem while using LLDPE-C4 polymer can be applied to other polymers and extrusion heads and nozzles of different dimensions and shapes.

LIST OF REFERENCE NUMERALS 1 nozzle outlet
3 nozzle
5,7 monofilament nozzles
10 central opening of the nozzle outlet
20, 30 side edge openings
40, 50 extrusion heads
100 dual-channel nozzle
102 inner channel
104 outer channel
106 joining path 108 nozzle outlet
110 extrusion plate
112 heating channel
114 coextrusion path
116 coextrusion head opening
202 flow direction of cladding polymer component
204 flow direction of core polymer component
206 turbulent flow
300 channel plate
310 first channel
312 first pressure chamber
320 second channel
322 second pressure chamber
400 first distribution chamber
500 second distribution chamber

What is claimed is:

1. An extrusion apparatus suitable for manufacturing artificial turf polymer fiber free of fiber splitting, the extrusion apparatus comprising an extrusion head comprising:
   an inlet for receiving a polymer material,
   a nozzle, and
   a nozzle outlet,
   wherein the nozzle is in hydraulic connection with the inlet and the nozzle outlet, and
   wherein a ratio of an equivalent diameter of the nozzle outlet over an axial length of an inner capillary channel of the nozzle is from 0.90 to 1.10,
   wherein the equivalent diameter is the diameter of a circle-shape cross-section nozzle outlet having a same area as an area of an actual cross-section of the nozzle outlet.

2. The extrusion apparatus of claim 1, wherein the nozzle outlet has a circle-shape cross-section, an oval-shape cross-section, a rectangular shape cross-section, a V-shape cross-section, a W-shape cross-section, a C-shape cross-section, an Q-shape cross-section, or any combination thereof.

3. The extrusion apparatus of claim 1, wherein the equivalent diameter of the nozzle outlet from 0.25 mm to 5 mm.

4. The extrusion apparatus of claim 1, wherein the polymer fiber is made of LLDPE including LLDPE-C4.

5. The extrusion apparatus of claim 1, wherein the axial length of the inner capillary channel of the nozzle is from 0.5 mm to 5.0 mm.

6. The extrusion apparatus of claim 1, wherein the nozzle outlet comprises a rectangular-shape cross-section having a width to thickness ratio (WTR) from 2 to 30.

7. The extrusion apparatus of claim 1, wherein the nozzle outlet comprises a circle-shape cross section, an oval-shape cross section or a rectangular-shape cross section, or any combination thereof.

8. The extrusion apparatus of claim 1, wherein the nozzle outlet has a central opening having a concave-shape, rectangular-shape, or circle-shape cross section and first and second edge openings having a circle-shape, oval-shape, or rectangular shape cross section arranged symmetrically with respect to a longitudinal axis of symmetry of the capillary channel of the nozzle.

9. The extrusion apparatus of claim 8, wherein the central opening of the nozzle outlet has a constant thickness along its entire width, and wherein the first and second edge openings of the nozzle outlet each has a circle-shape cross section.

10. The extrusion apparatus of claim 9, wherein the central opening has a radius curvature of 1.2 mm to 2.0 mm, a width of 2.5 mm to 6.0 mm and a thickness of 0.3 mm to 0.7 mm, and wherein the first and second edge openings each have a radius of from 0.3 mm to 0.7 mm.

11. The extrusion apparatus of claim 1, further comprising a heating element for heating the polymer to have at the nozzle outlet a temperature of 225° C. to 260° C.

12. Use of the extrusion apparatus of claim 1 in a method for making artificial turf fiber, wherein LLDPE polymer material comprising LLDPE-C8, or LLDPE-C6, or LLDPE-C4 or a combination thereof is fed through the extrusion head and processed through the extrusion head to produce artificial turf fiber substantially free of splitting.

13. The use of the extrusion apparatus as in claim 12, wherein the extruded polymer mass at the nozzle outlet has a viscosity as measured by a melt flow index of 0.2 to 15 g/10 min, a temperature of 190° C. to 250° C., and a density of 0.86 to 0.98 g/cm3, wherein the pressure at the extrusion is 30 to 120 bar, and wherein the polymer mass is extruded at a speed of 100 to 600 m/min.

14. A method for making turf fiber from LLDPE-C4 that is resistant to splitting, the method comprising:

feeding LLDPE to an extrusion apparatus, heating the LLDPE to a temperature above its melting point and extruding the melted LLDPE through the nozzle outlet to form a turf fiber, wherein the extrusion apparatus is according to claim 1.

15. The method of claim 14, wherein the extruded polymer mass at the nozzle outlet has a viscosity as measured by a melt flow index of 0.2 to 15, a temperature of 190° C. to 250° C., and a density of 0.86 to 0.98 g/cm3, wherein the pressure at the extrusion is 30 to 120 bar, and wherein the polymer mass is extruded at a speed of 100 to 600 m/min.

* * * * *